United States Patent [19]

Huang

[11] Patent Number: 4,726,223

[45] Date of Patent: Feb. 23, 1988

[54] TIRE PRESSURE DETECTOR

[76] Inventor: Tien-Tsai Huang, No. 4, Lane 30, Wu Chuan St., Panchiao City, Taiwan

[21] Appl. No.: 888,241

[22] Filed: Jul. 21, 1986

[51] Int. Cl.$^4$ .................... B60C 23/04; G01L 7/16; G01L 17/00
[52] U.S. Cl. .................... 73/146.8; 73/745; 340/58
[58] Field of Search .............. 73/146.8, 744, 745; 340/58

[56] References Cited

U.S. PATENT DOCUMENTS

| 2,948,256 | 8/1960 | Tapp | 73/146.8 |
| 3,824,849 | 7/1974 | Foxhall | 73/146.8 |
| 3,827,393 | 8/1974 | Winther | 73/146.8 |
| 3,938,078 | 2/1976 | Davis et al. | 340/58 |
| 4,590,794 | 5/1986 | Liebl | 340/58 |

Primary Examiner—Donald O. Woodiel

[57] ABSTRACT

A tire pressure detector comprises a hollow cylindrical casing having an internal screw thread for attachment to an inflating valve of a tire. A transverse partition member which divides the casing into two chamber is provided with a projecting pin for pushing the inflating valve to an open position. A cap member is secured to the casing for closing one of the chambers, and a piston member responsive to the pressure is mounted in the chamber. An alarm means is connected to the piston member and has a portion extending out through the cap member. The alarm means may be a graduated rod or an electric light means.

5 Claims, 4 Drawing Figures

TIRE PRESSURE DETECTOR

BACKGROUND OF THE INVENTION

This invention relates to a pressure detector, particularly to a pressure detector for inspecting and warning of a pressure deficiency in a tire.

A very common practice to inspect whether a tire has enough air pressure for operation or not is accomplished by feeling, such as by pressing the tire with hand or knocking the tire with a hammer or the like. There have also been developed pressure gauges for determining the pressure in the tire.

SUMMARY OF THE INVENTION

An object of the invention is to provide a tire pressure detector with a simple construction which is more compact and inexpensive than the conventional pressure gauges.

The present invention provides a tire pressure detector which comprises: a hollow cylindrical casing having a transverse partition member dividing the casing into a first and a second chamber, and a passage communicating the first and second chambers, the wall of the casing having an internal screw thread in the first chamber for attachment to the inflating valve, and the partition member having a pin member projecting therefrom into the first chamber pushing the inflating valve to an open position.

A cap member is secured to the casing for closing the second chamber. A piston member responsive to the pressure in the second chamber is mounted movably in the second chamber. There is an alarm means connected to the piston member and having a portion extending out through the cap member for presenting a warning to the user when the pressure in the tire is insufficient.

In one aspect of the invention, the communicating passage is an opening formed in the partition member, and the alarm means includes an axial rod connected to the piston member and passing through the cap member, and a spring member sleeved on the axial rod between the piston member and the cap member. The axial rod is provided with graduation marks thereon by which one can determine whether the pressure in a tire is in good operative condition.

In another aspect of the invention, the alarm means includes a light bulb seat mounted in the casing near the cap member, a light bulb with a first electric contact element mounted in the seat and exposed from the casing, a second electric contact element disposed on the piston member, a battery electrically connected to the second electric contact element, and a spring member connected to the partition member and the battery for biasing the piston member toward the first electric contact element to lighten the bulb when the pressure in the tire is deficient.

The present exemplary preferred embodiment will be described in detail with reference to the following drawings, in which

DETAILED DESCRIPTION OF THE PREFERRED EMBODIMENT

Figure 1:
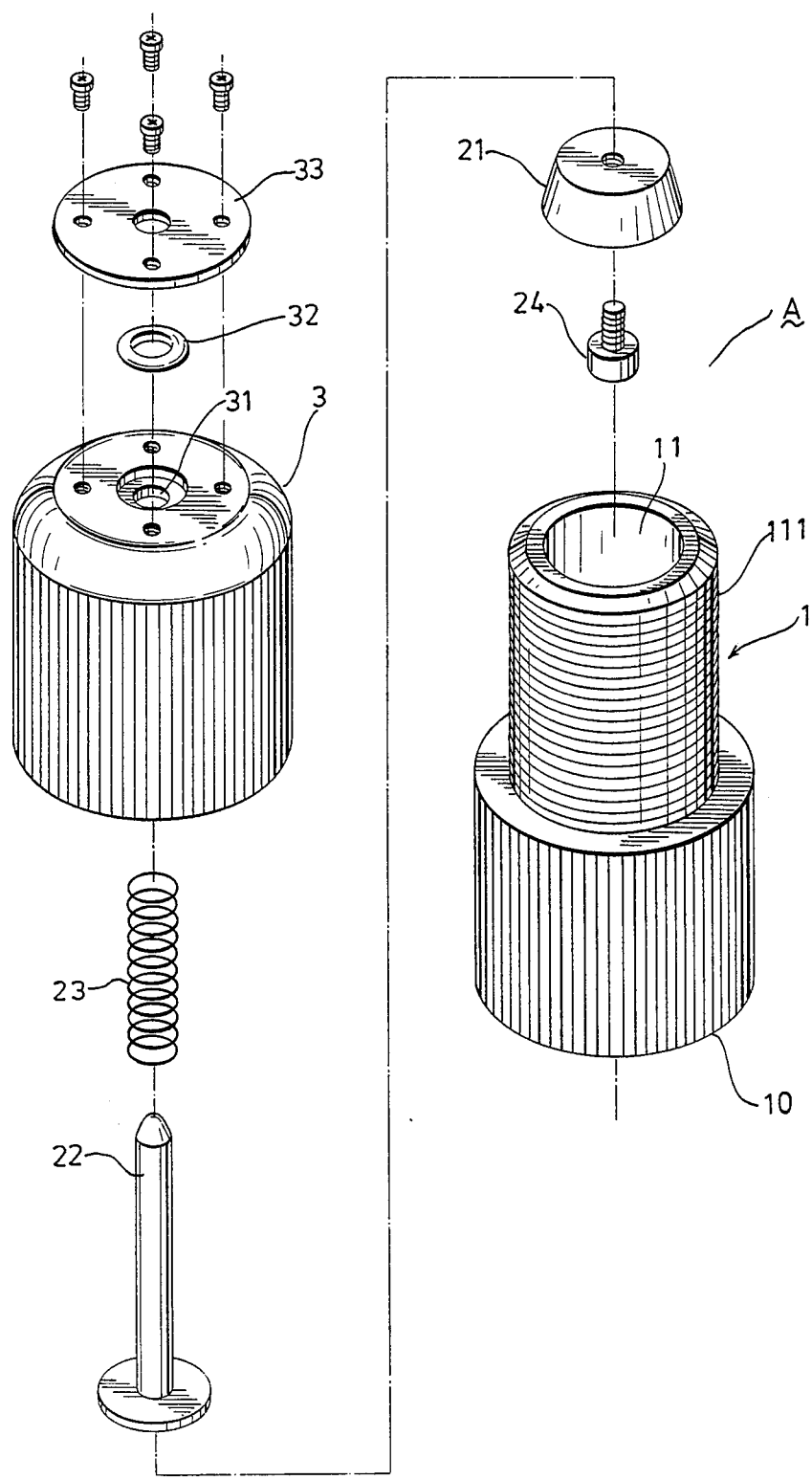
FIG. 1 is an exploded view of a tire pressure detector embodying the present invention.
Figure 2:
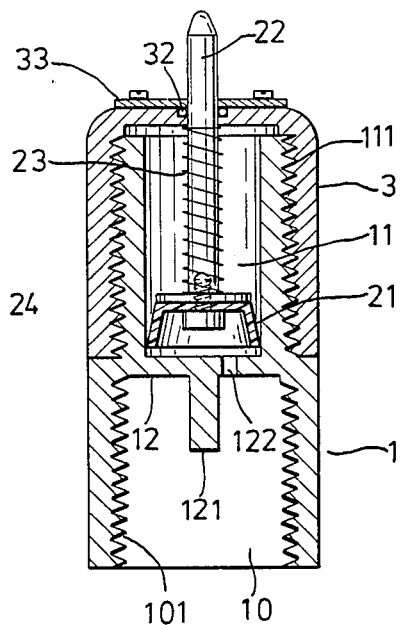
FIG. 2 is a sectional view of the tire pressure detector of FIG. 1.

Referring to FIGS. 1 and 2, a tire pressure detector A is shown, including a hollow cylindrical casing 1 which has a transverse partition member 12 dividing the casing into a chamber 10 and a chamber 11. The wall of the casing 1 has an internal screw thread 101 in the chamber 10 for attachment to a inflating valve means of a tire. The partition member 12 has a pin member 121 which projects therefrom into the chamber 10 to be used for pushing the inflating valve to an open position. A opening 122 is disposed in the partition member 12 for communicating the chambers 10 and 11.

A cap member 3 is connected to the casing 1 to close the chamber 11. The cap member 3 has an internal screw thread engaging with an outer screw thread 111 of the casing 1. In the chamber 11 is mounted a bowl-shaped piston member 21 which is responsive to the pressure in the chamber 11 or in the tire. The piston member 21 is connected to an axial rod 22 by means of a fastener 24. The axial rod 22 extends outward, passing through a hole 31 provided in the cap member 3. The axial rod 22 is kept in a sealing relationship with the cap member 3 by means of a sealing ring 32. A spring member 23 is sleeved on the axial rod between the piston member 21 and the cap member 3 so as to bias the piston member toward the partition member 12. The axial rod 22 is further provided with graduation marks.

In operation, the casing 1 is attached to the inflating valve of the tire by means of the screw thread 101. The inflating valve of the tire will be opened by a push of the pin 121 of the partition member 12. The air from the tire flows into the chamber 11 and pushes the piston member 21 against the spring 23. The portion of the axial rod 22 which projects out of the chamber 11 will show the existing pressure of the tire so that one can determine whether the pressure in the tire is sufficient for operation.

Figure 4:
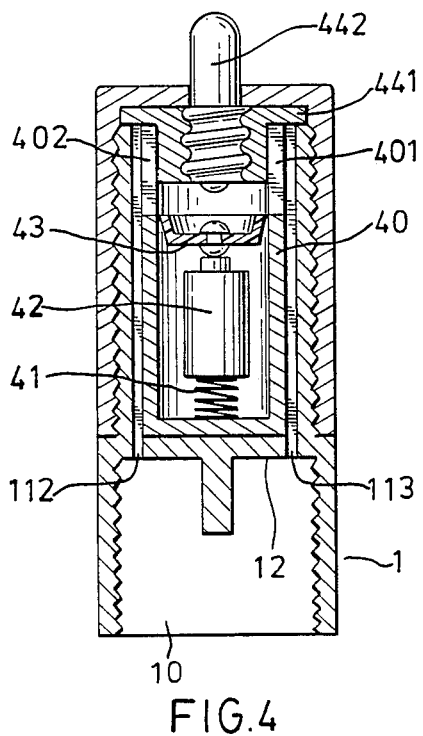
FIG. 4 is a sectional view of the tire pressure detector of FIG. 3.
Figure 3:
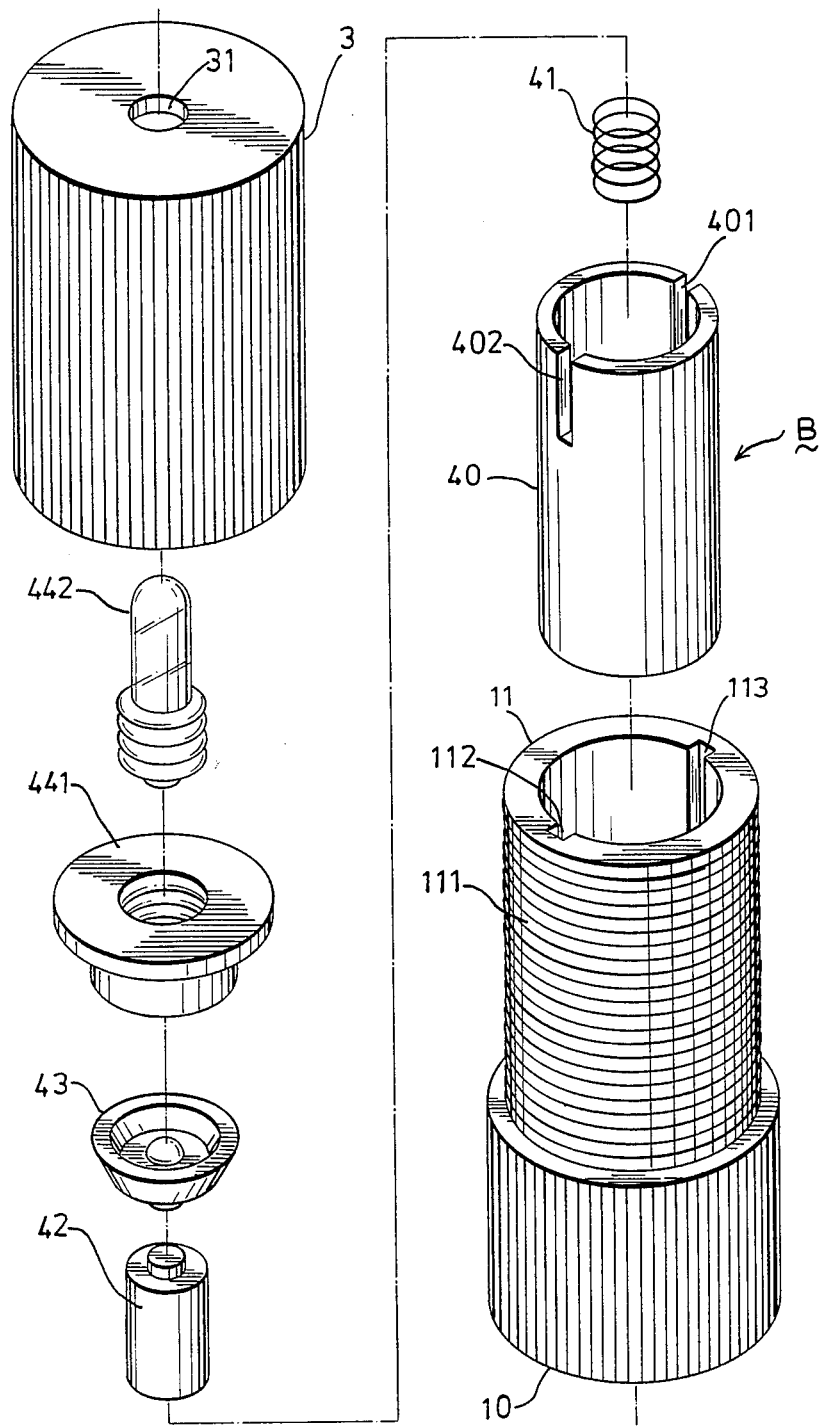
FIG. 3 is an exploded view of an alternative tire pressure detector embodying the present invention.

An alternative embodiment of a tire pressure detector is designated as B in FIGS. 3 and 4, wherein the elements identical to those of the former embodiment are represented by the same numerals. The tire pressure detector B includes an alarm means 4 instead of the piston member 21 and the graduated axial rod 22. An inside tube 40 which has two diametrically opposite apertures 401 and 402 is inserted in the chamber 11 of the casing 1. The inner side of the wall of the casing 1 further has two axial grooves 112 and 113 which extend from the partition member 12 to the end of the casing 1 and which are disposed at diametrically opposite positions in alignment with the apertures 401 and 402 of the inside tube 40. The grooves 112 and 113 and the apertures 401 and 402 form two passages which communicate the chamber 10 and the chamber defined by the inside tube 40.

A light bulb seat 441, which is a hollow cylindrical member having an annular flange, is mounted in the inside tube 40, the annular flange of the bulb seat 441 being clamped between the cap member 3 and the end of the casing 1. A light bulb 442 is seated in the bulb seat 441 and partly projects out of the casing 1. The light bulb 442 has a first electric contact element (not shown) at its end.

A second electric contact element (not shown) is arranged on a piston member 43 which is responsive to the pressure in the inside tube 40. The piston member 43 is electrically connected to a mercury cell 42 which in turn is connected to a spring 41 that is mounted on the partition member 12. The spring 41 biasses the piston member 43 towards the light bulb seat 441 so that the electric contact of the piston member contacts the electric contact of the light bulb to lighten the bulb 442 as a warning signal. The force of the spring 41 is so arranged that it urges the piston member 43, when the pressure in the inside tube 40 or in the tire is insufficiently low, and that it is compressed when the pressure in the inside tube 40 is sufficient.

In detecting the pressure of a tire with the tire pressure detector B, the detector B is attached to the inflating valve of the tire. The air in the tire flows into the chamber of the inside tube 40 from the passages formed via the grooves 112, 113, and apertures 401, 402, and acts on the piston member 43. If the light bulb 442 is not lit. it is known that the piston member is moved away from the light bulb 442, and the pressure in the tire is considered sufficient. On the contrary, if the light bulb 442 is lit, the piston member or its electric contact element is in contact with the light bulb 442, and the pressure in the tire is considered insufficient.

With the invention thus explained, it is apparent that various modifications and variations can be made without departing from the scope of the invention. It is therefore intended that the invention be limited as indicated in the appended claims.

What I claim is:

1. A pressure detector for a tire having an inflating valve comprising:

a hollow cylindrical casing having a transverse partition member dividing said casing into a first and a second chamber, and a passageway communicating with said first and second chambers, the wall of said casing having an internal screw thread in said first chamber for attachment to said inflating valve, said partition member having a pin member projecting therefrom into said first chamber for pushing said inflating valve to an open position;

a cap member secured to said casing for closing said second chamber;

an inside tube inserted in said second chamber and having first conduit-defining means for establishing fluid communication between the second chamber and the portion of the tube near the cap member;

a piston member mounted in the inside tube for reciprocating movement in response to the pressure in said second chamber;

second conduit means for establishing fluid communication between said first chamber and said second chamber;

alarm means positioned to be connected to said piston member when the pressure in the second chamber is not more than a preselected level, and having a portion extending out through said cap member; and biasing means for disconnecting the piston from the alarm means when the pressure in the second chamber is more than the preselected level.

2. A pressure detector as claimed in claim 1 wherein said first conduit means includes a portion of the wall of said inside tube having an aperture near said cap member, the inner side of the wall of said casing having an axial groove extending from said partition member toward said cap member for communicating said first chamber and said inside tube.

3. A tire pressure detector as claimed in claim 2, wherein said alarm means includes a light bulb seat mounted adjacent said cap member, a light bulb mounted in said light bulb seat and exposed from said casing, said light bulb having a first electric contact extending into said second chamber, a second electric contact element disposed on said piston member, a battery electrically connected to said second electric contact element, and a spring member connected to said partition member and said battery for urging said piston member toward said first electric contact.

4. A pressure detector as claimed in claim 2 wherein said groove is in alignment with said aperture for communicating said first chamber and said inside tube.

5. A pressure detector as claimed in claim 2 wherein said first conduit means includes a portion of the wall of said inside tube having a second aperture at a generally diametrically opposite position along the inside tube wall from the first aperture, the inner side of the wall of said casing having a second axial groove extending at a diametrically opposite position with respect to said first groove from said partition member toward said cap member, said grooves being in alignment with said apertures for communicating said first chamber and said inside tube.

* * * * *